United States Patent
Chambers et al.

(10) Patent No.: US 10,841,280 B2
(45) Date of Patent: Nov. 17, 2020

(54) USER DEVICE-BASED ENTERPRISE WEB FILTERING

(71) Applicant: Lightspeed Solutions, LLC, Bakersfield, CA (US)

(72) Inventors: Robert Chambers, Round Rock, TX (US); Kevin Sanders, Manchaca, TX (US)

(73) Assignee: LIGHTSPEED SYSTEMS, INC., Austin, TX (US)

(*) Notice: Subject to any disclaimer, the term of this patent is extended or adjusted under 35 U.S.C. 154(b) by 123 days.

(21) Appl. No.: 15/923,557

(22) Filed: Mar. 16, 2018

(65) Prior Publication Data
US 2019/0288985 A1    Sep. 19, 2019

(51) Int. Cl.
*H04L 29/06* (2006.01)
*G06F 21/62* (2013.01)
*G06F 21/60* (2013.01)

(52) U.S. Cl.
CPC ...... H04L 63/0236 (2013.01); G06F 21/6263 (2013.01); H04L 63/0281 (2013.01); H04L 63/0428 (2013.01); H04L 63/101 (2013.01); *G06F 21/606* (2013.01)

(58) Field of Classification Search
CPC ............ H04L 63/0236; H04L 63/101; H04L 63/0428; H04L 63/0281; H04L 63/0464; G06F 21/6263; G06F 21/606; G06N 3/0427; G06K 9/6271; G06K 9/00536; G06K 9/6262; G06K 2209/05; G01S 19/47; G01S 19/52; G06T 7/251
See application file for complete search history.

(56) References Cited

U.S. PATENT DOCUMENTS

| | | | |
|---|---|---|---|
| 9,154,479 B1* | 10/2015 | Sethi | H04L 63/08 |
| 9,667,603 B2* | 5/2017 | Sandoval | G06F 9/54 |
| 10,284,526 B2* | 5/2019 | Moore | H04L 47/2433 |
| 2009/0178061 A1* | 7/2009 | Sandoval | G06F 9/54 |
| | | | 719/328 |

(Continued)

FOREIGN PATENT DOCUMENTS

WO    WO-02084512 A1 * 10/2002 ....... H04L 29/12018

OTHER PUBLICATIONS

Ertugrul Akbas; "Next Generation Filtering: Offline Filtering Enhanced Proxy Architecture for Web Content Filtering", 2008, IEEE, pp. 1-4. (Year: 2008).*

*Primary Examiner* — Matthew Smithers
(74) *Attorney, Agent, or Firm* — Norton Rose Fulbright US LLP

(57) ABSTRACT

Web-filtering operations may be implemented on the user device, rather than on a centralized proxy server, to improve reliability, performance, and/or security of the web-filtering operations. Some or all of the necessary functions related to web-filtering may be performed on the end user device to remove the complexity and security issues inherent with the current methodology. One technique for allowing operation of proxy servers on user devices is to install smart agents on the user device. The smart agents, under control of a management server, may configure the proxy server, issue trust certificates to applications on the device, and/or provide proxy access configuration (PAC) files to applications on the device.

20 Claims, 6 Drawing Sheets

(56) References Cited

U.S. PATENT DOCUMENTS

| | | | |
|---|---|---|---|
| 2014/0337918 A1* | 11/2014 | Siddiqi | G06F 21/56 |
| | | | 726/3 |
| 2014/0351573 A1* | 11/2014 | Martini | H04L 63/0428 |
| | | | 713/153 |
| 2016/0119284 A1* | 4/2016 | Kim | H04W 76/10 |
| | | | 726/12 |
| 2016/0285832 A1* | 9/2016 | Petrov | H04L 63/0428 |
| 2016/0330230 A1* | 11/2016 | Reddy | H04L 63/1433 |

* cited by examiner

USER DEVICE-BASED ENTERPRISE WEB FILTERING

FIELD OF THE DISCLOSURE

The instant disclosure relates to web filtering. More specifically, portions of this disclosure relate to web filtering for an enterprise using software at the user-device level.

BACKGROUND

Web filtering refers to the checking of a website being requested by a user of a device to determine if the user is permitted to access the requested websites. Web filtering may be performed to prohibit access to illegal or inappropriate content based on user age. For example, in a school system, web filtering may be used to prevent student access to websites that do not include appropriate educational content. Internet traffic to websites can be encrypted (e.g., secure) communications or unencrypted (e.g., insecure) communications. Conventionally, encrypted communications were used primarily for accessing financial websites and other websites storing sensitive information, whereas unencrypted communications were used for most other communications. Encrypted communications present difficulties in performing web filtering because encrypted communications are designed to prevent snooping of information between the user and the website, which also prevents filtering of the encrypted communications.

Recently, nearly all websites are now using encrypted communications, resulting in as much as eighty percent of network traffic being encrypted. This encryption prevents traditional web filters from viewing, reporting, or applying proper policy to this traffic. A conventional solution for web filtering of secure communications is accomplished through centralized banks of Trusted Man-In-The-Middle (MITM) Proxy Servers. An example centralized proxy server system of the prior art is illustrated in FIG. 1. FIG. 1 is a block diagram of an enterprise-level web filtering system according to the prior art. In a network 100, devices 110 and 120 communicate with websites in the Internet 102 through proxy server 130. Trust certificates are issued from Certificate Authority (CA) 134 on proxy server 130 to devices 110 and 120 to allow the proxy server 130 to filter websites securely accessed by the devices 110 and 140. Trust certificate 114 is used by browser 112 on device 110 to securely communicate with the proxy server 130. The proxy server 130, having generated the trust certificate 114 for the device 110, can decrypt the secure communication from the browser 112 to allow web filtering of the communication. After the communications are passed through the web filter 132, the proxy server 130 obtains the website requested by the browser 112 using secure communications to the Internet 102, encrypts the obtained website data, and securely communicates the encrypted website data to the browser 112 for display to the user.

Centralized banks of proxy servers, such as the proxy server 130, present many challenges to the organization needing to implement access management. For example, the device 110 requires a proxy configuration 116 to point the device's traffic to the organization's proxy server 130. This proxy configuration sometimes must be deployed multiple times to the same machine as proxy configuration 116 for browser 110 and proxy configuration 126 for browser 120. Additionally, a Trust Certificate 114 must be obtained from the proxy server 130 and installed on the end user's device. As with the proxy configuration 116 and 126, this needs to be repeated to obtain Trust Certificate 124 for browser 120. Routing all of the appropriate internet traffic through the organization's proxy server 130 presents additional management and resources the organization must dedicate to the web filtering process. The routing also introduces latency into the web user's Internet experience causing frustration for the end users. Of more concern to the end user is the potential for security breaches caused by the use of the centralized proxy server 130. If the proxy server 130 is compromised then all of the proxy-routed traffic for all of the users is decrypted and viewable by anyone with access to the proxy server 130.

Shortcomings mentioned here are intended to be examples of shortcomings of the described systems and not exhaustive of the systems' deficiencies. Embodiments of the invention described below provide improvements on the conventional systems described above the may address one or more of the shortcomings described above.

SUMMARY

Web-filtering operations may be implemented on the user device, rather than on a centralized proxy server, to improve reliability, performance, and/or security of the web-filtering operations. Some or all of the necessary functions related to web-filtering may be performed on the end user device to remove the complexity and security issues with the conventional systems described above and to improve functioning of web filters. The use of a proxy server on individual user devices is unconventional and counterintuitive because management of the proxy server on the user device is more difficult than management of a centralized proxy server. For example, a person may not consider locating the proxy server on the user device because the user may be able to compromise the proxy server configuration or bypass the proxy server if the user has administrative privileges on the user device. One technique for allowing operation of proxy servers on user devices is to install smart agents on the user device. The smart agents, under control of a management server, may configure the proxy server, issue trust certificates to applications on the device, and/or provide proxy access configuration (PAC) files to applications on the device. The smart agents are one example technique enforcing web-filtering on the user device. By performing the web-filtering, reporting and content management, and/or decryption of the secure communications on the end user's device, latency and security concerns associated with a centralized proxy server are eliminated or reduced.

In some embodiments, the smart agent creates a local and unique Certificate Authority (CA) on the user device. The CA is automatically and transparently setup as trusted on the end users' device without user interaction. The setup may be applied by the smart agent across various applications including applications that use the base operating systems' certificate store and/or applications that use an independent certificate store. For example, part of the setup process may include the smart agent automatically and transparently configuring the operating system proxy configuration settings to designate the device as the proxy server at a designated port. This may require no end user interaction and applies across various applications, including applications that use the base operating systems' certificate store as well as applications that use an independent certificate store. With the proxy configuration and a Trust Certificate in place on the user device, the traffic on the machine is automatically routed to the on-device trusted proxy server for decryption and additional analysis and modification to apply the web filtering policy and/or reporting. In some embodiments, if an application on the device attempts to access content that should be decrypted, such as an Internet search or social media content, the smart agent may automatically disable such an access to prevent attempts to bypass the proxy server. In some embodiments, the smart agent proxies non-encrypted traffic to allow for proper content management and reporting.

Placing a smart agent on a user device creates a significant reduction in IT management and also a significant increase in overall security. In today's security sensitive world centralized proxy servers are difficult to manage and are a significant security vulnerability. This is especially true in industries that have highly-regulated security requirements, such as educational organizations. Schools are bound by a number of privacy requirements to ensure the protection of student data, especially anything that is personally identifiable. The privacy requirements may include federal requirements with COPPA, FERPA and HIPPA and state-specific requirements. A centralized bank of proxy servers can be compromised and has the ability to see all of the internet traffic for all of the users on that bank of servers allowing a malicious user access to all kinds of personal information including financial, medical, education, etc. This security problem is alleviated by the use of proxies on user devices, because the decryption occurs only on the users' device where the data would have already existed decrypted. With user device-based proxies if a single machine is compromised through malware or a virus, there would be no impact on other user devices. Thus, a centralized management of proxy servers to provide web filtering and/or logging is provided through the described embodiments with little or no more risk than if proxy servers were not decrypting Internet traffic.

According to some embodiments, a method for filtering web requests may be performed on a user device with a proxy server executing on the user device. The method may include receiving, by a proxy server executing on a user device, a secure communication from an application, the application executing on the user device also executing the proxy server; decrypting, by the proxy server, the secure communication from the application using a first trust certificate associated with the proxy server and the application, the secure communication including a request for a network resource located at a network address; and comparing, by the proxy server, the network address to a list of network addresses to determine whether communication with a network server at the network address is permitted. When communication with the network server is permitted based on the determination made using the list of network addresses, the user device may communicate securely, by the proxy server, with the network server at the network address to retrieve the network resource using a second trust certificate associated with the proxy server and the network server to obtain the network resource, and communicate securely, by the proxy server, with the user device to forward the network resource using the first trust certificate associated with the proxy server and the application.

In certain embodiments, the proxy server may be configured by a smart agent by installing, on the user device, a smart agent configured to manage secure communications on the user device by registering the user device with a management server; configuring, by the smart agent, the proxy server on the user device; and installing, by the smart agent, the first trust certificate for communicating securely between the application and the proxy server by installing the first trust certificate in an independent certificate store for the application, the application using the independent certificate store to communicate securely with the proxy server and/or installing the first trust certificate in an operating system certificate store, the application using the operating system certificate store to communicate securely with the proxy server.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
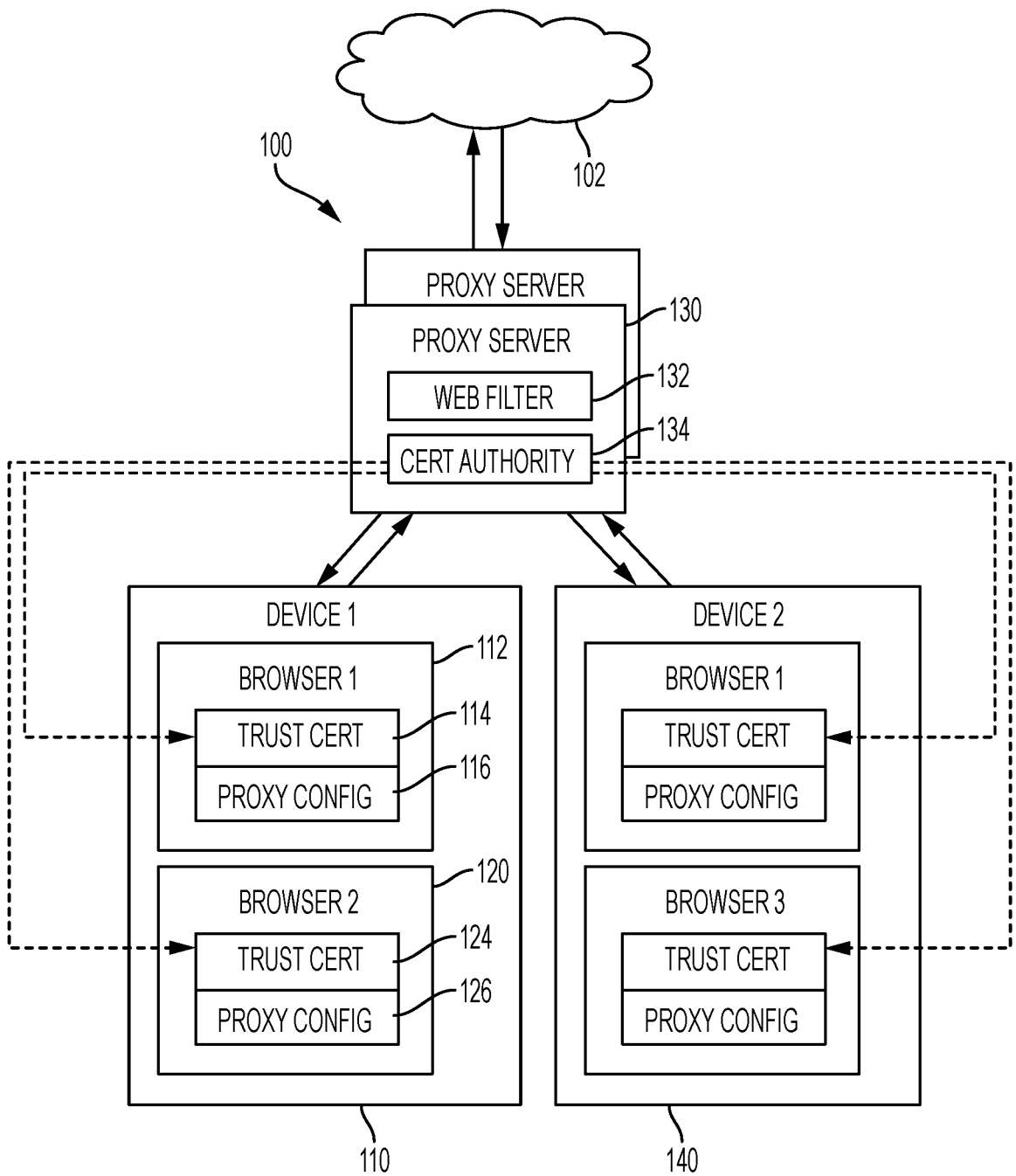
FIG. 1 is a block diagram of an enterprise-level web filtering system according to the prior art.
Figure 2:
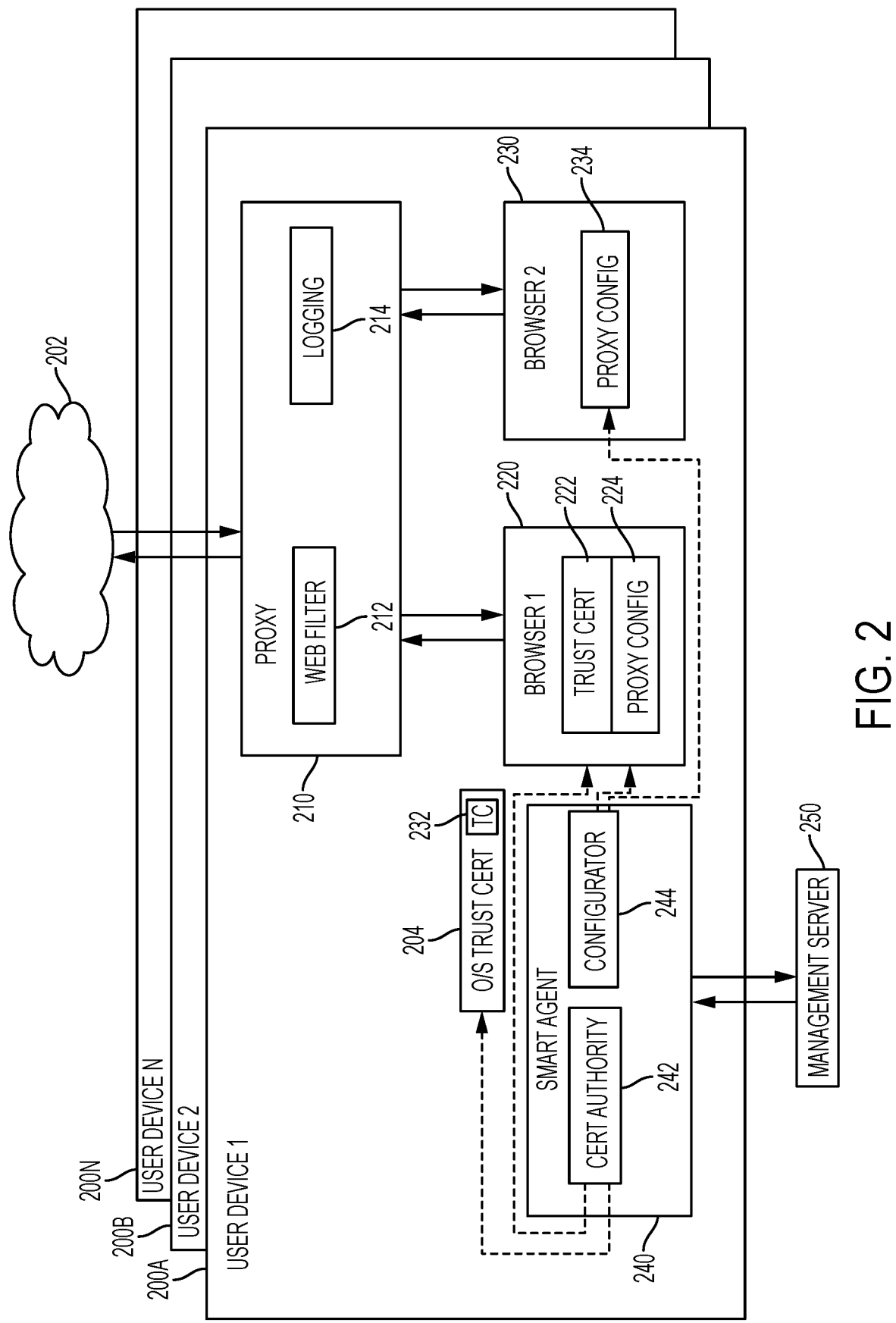
FIG. 2 is a block diagram of an enterprise-level web filtering system using user device-level proxies according to some embodiments of the disclosure.

Web-filtering on a user device may be implemented with a smart agent as shown in the example configuration of FIG. 2, although other configurations for implementing the inventive web-filtering are possible. FIG. 2 is a block diagram of an enterprise-level web filtering system using user device-level proxies according to some embodiments of the disclosure. A user device 200A may include a proxy 210 for communicating with network resources on network 202. The proxy 210 receives requests for network resources from applications, including from browser 220 and browser 230. The proxy 210 may include a web filter 212 and a logging engine 214. The web filter 212 may compare network addresses for network resources to a list of network addresses to determine if access to the network address should be permitted. The list may be, for example, a whitelist of permitted network addresses. In another example, the list may be a blacklist of prohibited network addresses. The logging engine 214 may record events, such as network requests made to the proxy 210, network addresses accessed by the browsers 220 and 230, requests denied by the web filter 212, and/or requests permitted by the web filter 212.

A smart agent 240 installed on the user device 200A may enable network communications through the proxy 210. The smart agent 240 may be an application or background service executing on the user device 200A with elevated privileges. The elevated privileges may allow the agent 240 to perform functions, such as the issuance of certificates, without interaction with the user (including administrators). The smart agent 240 may include a Certificate Authority (CA) 242 and/or a configurator 244. The CA 242 may issue Trust Certificates 222 and 232 to browser 220 and operating system trust store 204, respectively. The Trust Certificates 222 and 232 allow secure communication between the browsers 220 and 230 and the proxy 210 in such a manner that the proxy 210 may decrypt secure (e.g., encrypted) communications between the browsers 220 and 230 and a device in the network 202. Trust Certificates issued by the smart agent 240 may be stored in application-specific certificate stores, such as Trust Certificate 222, and/or in an operating system trust store 204, such as Trust Certificate 232. The configurator 244 may provide proxy configuration information, such as in the form of a proxy access configuration (PAC) file 224 and 234, to the browsers 220 and 230, and/or to other applications or the operating system. The proxy configuration information instructs applications to communicate through the proxy 210. The Trust Certificates 222 and 232 are used by the applications to encrypt communications to the proxy 210 such as requests for network resources. The proxy 210 can then decrypt the communications using a first trust certificate corresponding to the device 200A and the proxy 210, re-encrypt the communications using a second certificate corresponding to the device 200A and a destination device with the network address of the requested network resource. Using the second certificate, the proxy 210 communicates securely with the destination device and relays the requested network resource to the browser 220. Requested network resources may include, for example, a web page from an HTTP server, a file from an FTP server, an image from an HTTP server, JSON data from a web server, or the like.

A management server 250 may be coupled to the smart agent 240 through a communication channel. The smart agent 240 may communicate with the management server 250 over a public network, a private network, a virtual private network (VPN), a dedicated connection, a cellular connection, or another connection. The communication channel provides a connection to allow the management server 250 to control and/or monitor the smart agent 240, and through the smart agent 240 control and/or monitor the proxy 210. For example, the management server 250 may retrieve logs from the logging module 214. As another example, the management server 250 may update a list of network addresses used by the web filter 212. As a further example, the management server 250 may update application code for the smart agent 240 and/or the proxy 210. The management server 250 may control and/or monitor the user device 200A and other user devices 200B-N configured similarly to user device 200A. Although the configuration of a smart agent and proxy may be similar on user devices 200A-N, the user devices may be any type of devices including mobile phones, tablets, laptop computers, desktop computers, thin clients, servers, and other Internet-connected devices such as smart televisions and smart Blu-ray players.

Figure 3:
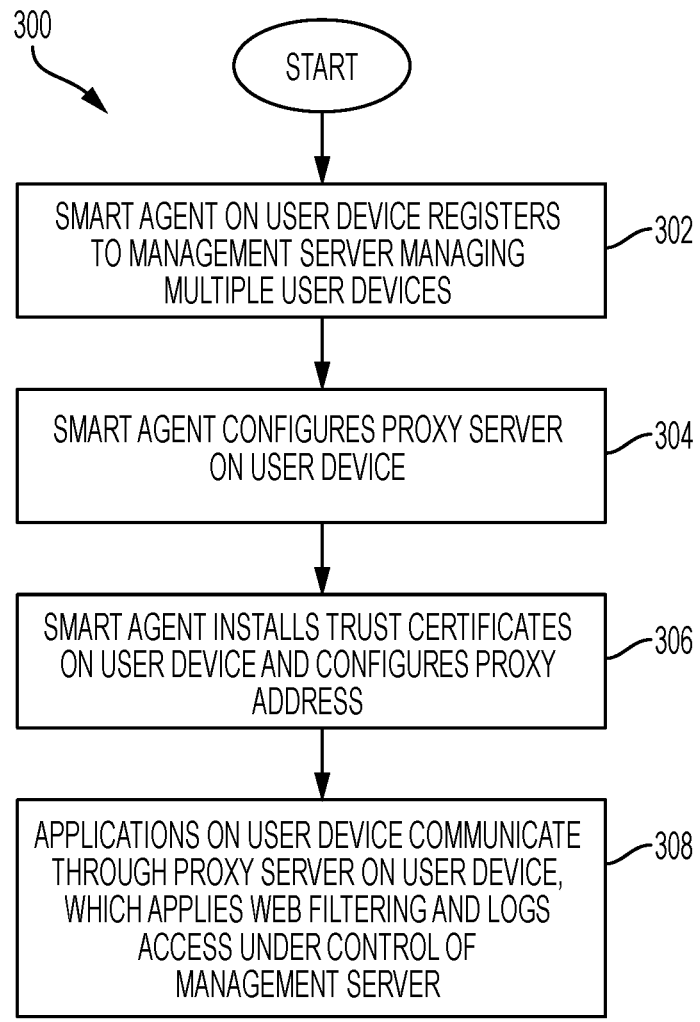
FIG. 3 is a flow chart illustrating an example method of initializing a user device in the enterprise-level web filtering system according to some embodiments of the disclosure.

A method of controlling the user device using a smart agent is shown in FIG. 3. FIG. 3 is a flow chart illustrating an example method of initializing a user device in the enterprise-level web filtering system according to some embodiments of the disclosure. A method 300 begins at block 302 with a smart agent installed on the user device registering to a management server that manages user devices. Prior to registering, a user may install the smart agent from an application store, a web site, a flash memory stick, or a compact disc (CD). When the smart agent is installed, a user (such as an administrator) may enter credentials to register the user device with the management server. The credentials may include a user name, a password, and a network address. During registration, the smart agent may receive information from the management server such as authentication information and setup parameters including an initial list of network addresses for a web filter. Then, at block 304, the smart agent configures a proxy server on the user device. The smart agent also configures the user device to use the proxy server, such as by installing trust certificates and configuring applications with a proxy address at block 306. The proxy address may be a local port number on the user device directed to the proxy server. When installing trust certificates, the certificates may be stored in independent application stores or an operating system store. With the proxy server configured and running, the applications on the user device communicate with the Internet or other network addresses through the proxy server at block 308. The proxy server may implement web filtering and/or logging under control of the management server through the smart agent. After the initial setup, the smart agent can regenerate trust certificates when required or at certain time intervals or at certain events. For example, trust certificates can be regenerated when the operating system or an application on the user device requires new parameters or characteristics in the certificate. Some browser application updates may revise a certificate parameter that was previously optional to be required. In a conventional centralized proxy server system a new certificate would have to be generated from the central bank of servers and then distributed to and trusted by the end user devices. During this transition the users on the end user machines will likely see errors or be prevented from accessing when browsing secure websites. With the automatic regeneration of the certificate on the user device, when an event like this occurs the smart agents may receive an indication from a management server that a new certificate is required and what the necessary parameter changes are. The smart agent will then regenerate the certificate and place the new certificate into the appropriate certificate storage space. This will be transparent to the end user and prevent any browsing errors. As another example, the trust certificate regeneration may happen about once per year. The trust certificates may be automatically generated and used to reestablish trust on the user device without any intervention from a user.

Figure 4:
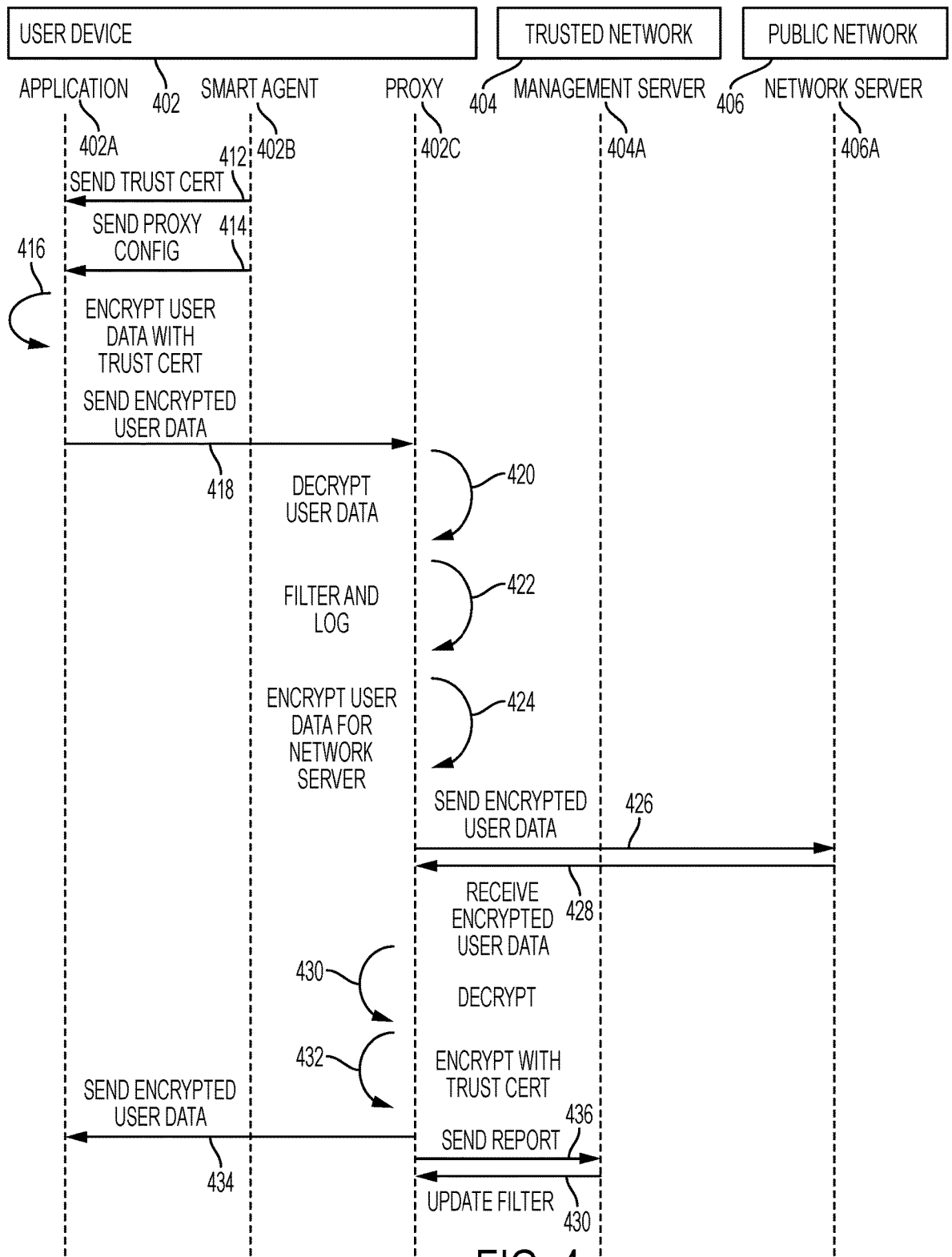
FIG. 4 is a call diagram illustrating and example communications flow for applying web filtering to an application on a user device in an enterprise-level web filtering system using user device-level proxies according to some embodiments of the disclosure.

A call diagram illustrating example communications in a web-filtering system implementing user device-based proxies is shown in FIG. 4. FIG. 4 is a call diagram illustrating and example communications flow for applying web filtering to an application on a user device in an enterprise-level web filtering system using user device-level proxies according to some embodiments of the disclosure. A user device 402 communicates through a trusted network 404 with a management server 404A. The user device 402 also communicates through a public network 406 with a network server 406A, such as an Internet website. The user device 402 may execute software such as application 402A, smart agent 402B, and proxy 402C. The smart agent 402B and proxy 402C provide access from the application 402A to the network server 406A under control of central management server 404A. The smart agent 402B performs an initial configuration by sending 412 a trust certificate to the application 402A and sending 414 a proxy configuration to the application 402A. The proxy configuration instructs the application 402A to direct Internet communications to the proxy 402C, which may be accessed through a local port number on the user device 402. The trust certificate is used by the application 402A to encrypt communication from the application 402A to the proxy 402C. Using the trust certificate allows the proxy 404C to decrypt the communication, apply filtering and/or logging processes to the decrypted communications, and re-encrypt the communications using a trust certificate associated with the network server 406A that is the destination of the communication. In some embodiments, the setup may include creating a local and unique Certificate Authority (CA) on the device, the Certificate Authority (CA) being automatically and transparently setup as trusted on the device without user interaction.

After the initial setup by the smart agent 402B, the application 402A may perform Internet communications instructed by a user to transmit network requests to the network server 406A, such as requests for files or websites. The communication may include encrypting 416 the user data, such as the network request, with the trust certificate. The encrypted user data is sent 418 to the proxy 402C. The proxy 402C decrypts 420 the user data. The decrypted user data is filtered and logged 420 without the decrypted user data leaving the user device 402. The proxy 402C encrypts 422 the user data for transmission to the network server 406A. The user data is transmitted 424 to the network server 406A and an encrypted response received 428 from the network server 406A. The response is decrypted 430 by the proxy 402C, which may apply filtering, logging, or other processing (not shown) on the response. The response is then encrypted 432 with the trust certificate and the encrypted data sent 434 to the application 402A.

The management server 404B provides a centralized location for enforcement of enterprise-wide web-filtering and other rules across a plurality of user devices. The proxy 402C may send 436 reports to the management server 404B regarding user access to network server 406A. The reports may be sent at the request of the management server 404B, at periodic intervals, or on the occurrence of certain events such as access to a blocked network address. The proxy 402C may also receive 438 updates to the web-filtering and logging rules from the management server 404B. For example, the update may include an updated list of network addresses for applying web-filtering or new rules specifying a level of detail for logging. The communications may instead be through the user agent 402B, although the proxy 402C is shown communicating with the management server 404B.

Figure 5:
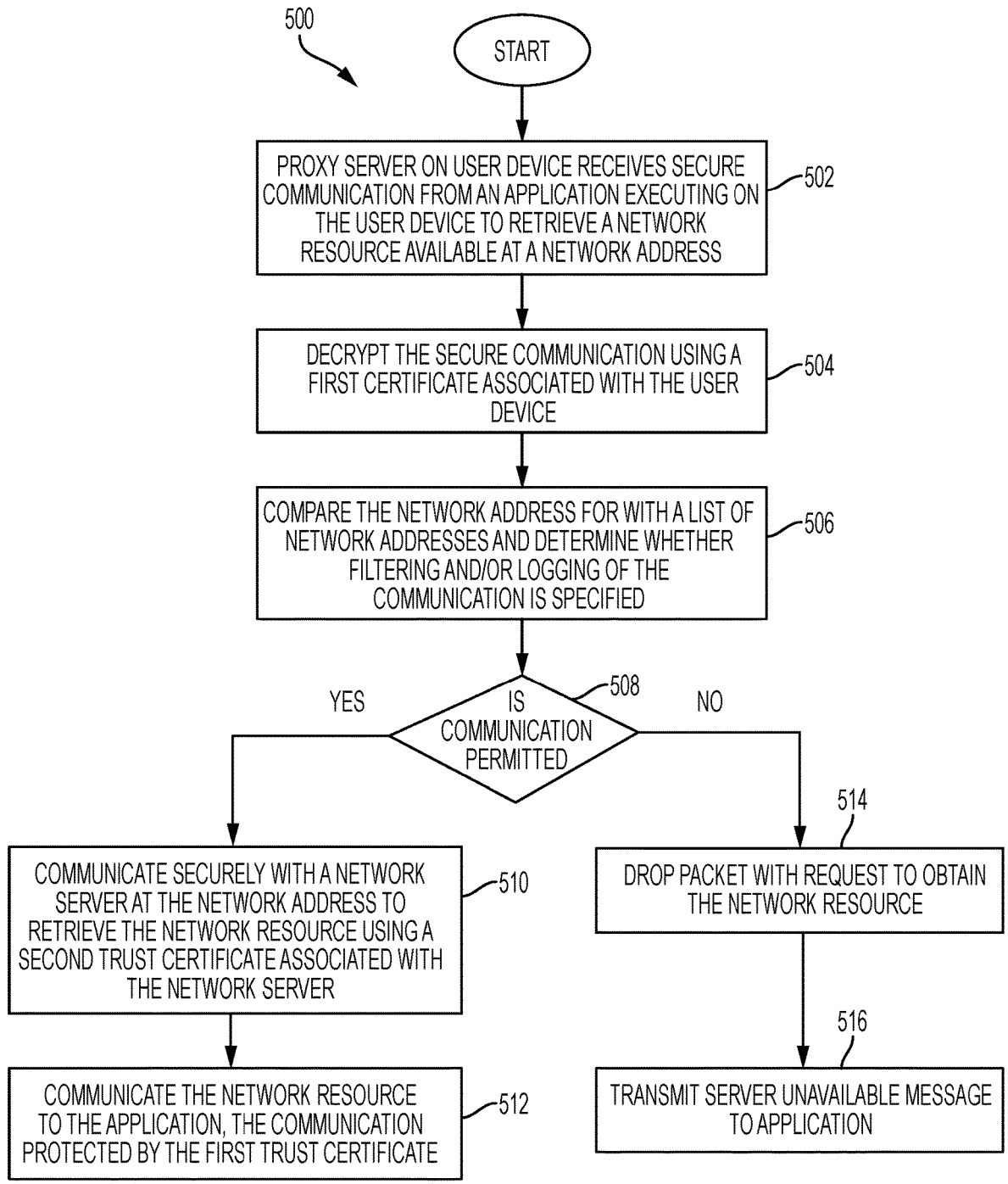
FIG. 5 is a flow chart illustrating an example method of secure communication through a proxy according to some embodiments of the disclosure.

A method for web filtering of network resources sent to a user device is illustrated in FIG. 5. FIG. 5 is a flow chart illustrating an example method of secure communication through a proxy according to some embodiments of the disclosure. A method 500 begins at block 502 with the proxy server on the user device receiving a request for a secure channel from an application executing on the platform. Then, at block 504, the secure communication is decrypted using a trust certificate. Next, at block 506, the request is filtered, such as by determining whether filtering and/or logging or another process is specified for the communication. If the communication being filtered is not permitted at block 508, then the method continues to drop the packet at block 514 and to transmit an error message at block 516. If the communication being filtered is permitted at block 508, the method continues to block 510 to communicate securely with a network server at the network address using a second trust certificate. At block 512, the secure communication is transmitted to the user device by decrypting using the second trust certificate and then encrypting using the first trust certificate.

Figure 6:
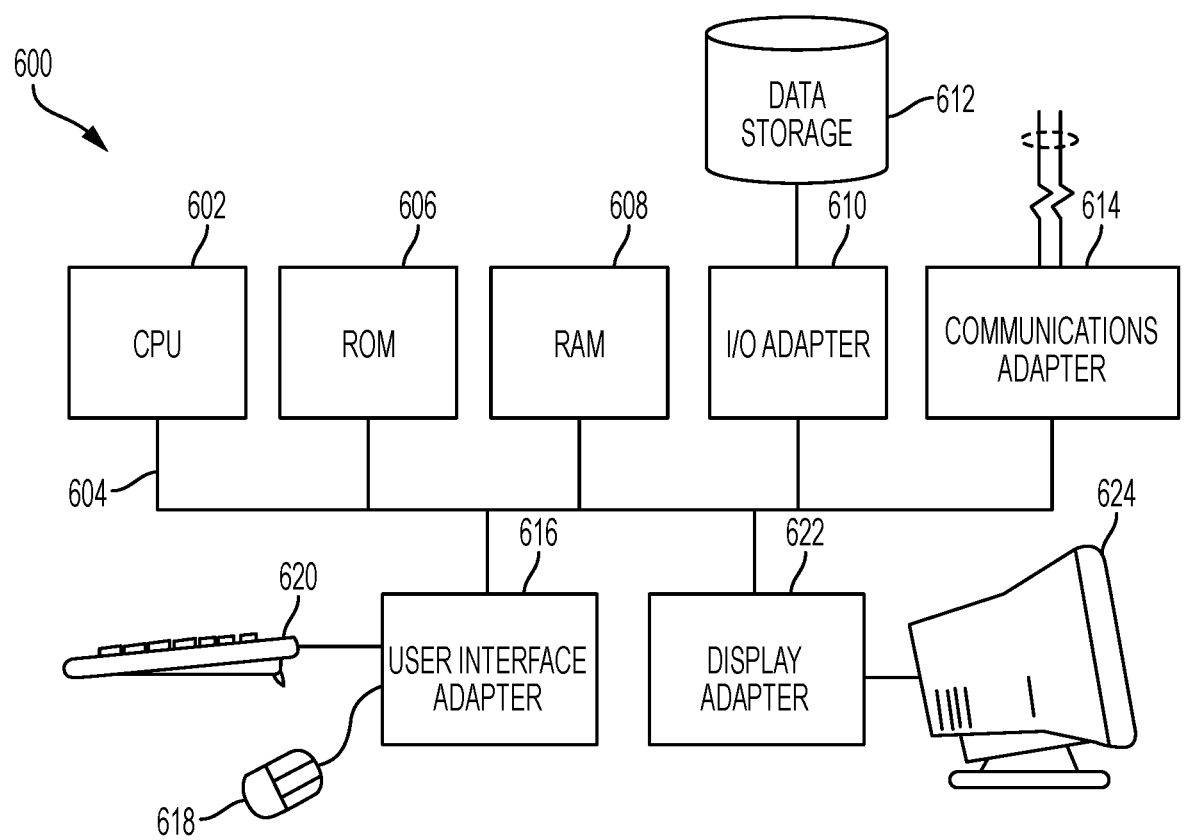
FIG. 6 is a schematic block diagram illustrating one embodiment of a user device that may be used in accordance with certain embodiments of the system.

FIG. 6 is a schematic block diagram illustrating one embodiment of a user device that may be used in accordance with certain embodiments of the system. A computer system 600 illustrates a computer system according to certain embodiments of the user device. The central processing unit (CPU) 602 is coupled to the system bus 604. The CPU 602 may be a general-purpose CPU or microprocessor. The present embodiments are not restricted by the architecture of the CPU 602, so long as the CPU 602 supports the modules, applications, and operations as described herein. The CPU 602 may execute various logical instructions according to disclosed embodiments.

The computer system 600 may include Random Access Memory (RAM) 608, which may be SRAM, DRAM, SDRAM, or the like. The computer system 600 may use RAM 608 to store the various data structures used by a software application. The computer system 600 may also include Read Only Memory (ROM) 606 which may be PROM, EPROM, EEPROM, optical storage, or the like. The ROM 606 may store configuration information for booting the computer system 600. The RAM 608 and the ROM 606 hold user and system data.

The computer system 600 may also include an input/output (I/O) adapter 610, a communications adapter 614, a user interface adapter 616, and a display adapter 622. The I/O adapter 610 and/or user the interface adapter 616 may, in certain embodiments, enable a user to interact with the computer system 600 in order to input information, such as to make network requests for network resources. In a further embodiment, the display adapter 622 may display a graphical user interface associated with software for generating the network requests, such as a web browser.

The I/O adapter 610 may connect to one or more data storage devices 612, such as one or more of a hard drive, a Compact Disk (CD) drive, a floppy disk drive, a tape drive, to the computer system 600. The communications adapter 614 may be adapted to couple the computer system 600 to a network, which may be one or more of a wireless link, a LAN and/or WAN, and/or the Internet. The user interface adapter 616 couples user input devices, such as a keyboard 620 and a pointing device 618 or a touchscreen, to the computer system 600. The display adapter 622 may be driven by the CPU 602 to control the display on the display device 624.

Disclosed embodiments are not limited to the architecture of system 600. Rather, the computer system 600 is provided as an example of one type of computing device that may be adapted to perform functions of a user device. For example, any suitable processor-based device may be utilized including, without limitation, personal data assistants (PDAs), computer game consoles, and multi-processor servers. Moreover, the present embodiments may be implemented on application specific integrated circuits (ASIC) or very large scale integrated (VLSI) circuits. In fact, persons of ordinary skill in the art may utilize any number of suitable structures capable of executing logical operations according to the disclosed embodiments.

The schematic flow chart diagrams of FIG. 3 and FIG. 5 are generally set forth as a logical flow chart diagram. Likewise, other operations for the circuitry are described without flow charts herein as sequences of ordered steps. The depicted order, labeled steps, and described operations are indicative of aspects of methods of the invention. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

In view of the disclosure above, one of ordinary skill in programming is able to write computer code or identify appropriate hardware and/or circuits to implement the disclosed invention without difficulty based on the flow charts and associated description in this specification. Therefore, disclosure of a particular set of program code instructions or detailed hardware devices is not considered necessary for an adequate understanding of how to make and use the invention. The inventive functionality of the claimed computer-implemented processes is explained in more detail in the above description and in conjunction with the figures.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
   receiving, by a proxy server executing on a user device, a secure communication from an application, the application executing on the user device also executing the proxy server;
   decrypting, by the proxy server, the secure communication from the application using a first trust certificate associated with the proxy server and the application, the secure communication including a request for a network resource located at a network address;
   comparing, by the proxy server, the network address to a list of network addresses to determine whether communication with a network server at the network address is permitted; and
   when communication with the network server is permitted:
      communicating securely, by the proxy server, with the network server at the network address to retrieve the network resource using a second trust certificate associated with the proxy server and the network server to obtain the network resource; and
      communicating securely, by the proxy server, with the user device to forward the network resource using the first trust certificate associated with the proxy server and the application.

2. The method of claim 1, further comprising:
   installing, on the user device, a smart agent configured to manage secure communications on the user device by registering the user device with a management server; and
   configuring, by the smart agent, the proxy server on the user device.

3. The method of claim 2, further comprising installing, by the smart agent, the first trust certificate for communicating securely between the application and the proxy server.

4. The method of claim 3, the step of installing the first trust certificate comprising installing the first trust certificate in an independent certificate store for the application, the application using the independent certificate store to communicate securely with the proxy server.

5. The method of claim 3, the step of installing the first trust certificate comprising installing the first trust certificate in an operating system certificate store, the application using the operating system certificate store to communicate securely with the proxy server.

6. The method of claim 2, further comprising:
   updating, by the smart agent, the list of network addresses for applying web filtering to secure communications from the application, the updating based on information received from the management server; and
   transmitting, by the smart agent, a log of secure communications from the application, the log being transmitted to the management server.

7. The method of claim 2, the step of installing the smart agent comprising creating a local and unique Certificate Authority (CA) on the device, the Certificate Authority (CA) being automatically and transparently setup as trusted on the device without user interaction.

8. A computer program product, comprising:
   a non-transitory computer readable medium comprising code to perform steps comprising:
   receiving, by a proxy server executing on a user device, a secure communication from an application, the application executing on the user device also executing the proxy server;
   decrypting, by the proxy server, the secure communication from the application using a first trust certificate associated with the proxy server and the application, the secure communication including a request for a network resource located at a network address;
   comparing, by the proxy server, the network address to a list of network addresses to determine whether communication with a network server at the network address is permitted; and
   when communication with the network server is permitted:
      communicating securely, by the proxy server, with the network server at the network address to retrieve the network resource using a second trust certificate associated with the proxy server and the network server to obtain the network resource; and
      communicating securely, by the proxy server, with the user device to forward the network resource using the first trust certificate associated with the proxy server and the application.

9. The computer program product of claim 8, wherein the medium further comprises code to perform steps comprising:
   installing, on the user device, a smart agent configured to manage secure communications on the user device by registering the user device with a management server; and
   configuring, by the smart agent, the proxy server on the user device.

10. The computer program product of claim 9, wherein the medium further comprises code to perform steps comprising installing, by the smart agent, the first trust certificate for communicating securely between the application and the proxy server.

11. The computer program product of claim 10, the step of installing the first trust certificate comprising installing the first trust certificate in an independent certificate store for the application, the application using the independent certificate store to communicate securely with the proxy server.

12. The computer program product of claim 10, the step of installing the first trust certificate comprising installing the first trust certificate in an operating system certificate store, the application using the operating system certificate store to communicate securely with the proxy server.

13. The computer program product of claim 9, wherein the medium further comprises code to perform steps comprising:
   updating, by the smart agent, the list of network addresses for applying web filtering to secure communications from the application, the updating based on information received from the management server; and
   transmitting, by the smart agent, a log of secure communications from the application, the log being transmitted to the management server.

14. The computer program product of claim 9, the step of installing the smart agent comprising creating a local and unique Certificate Authority (CA) on the device, the Certificate Authority (CA) being automatically and transparently setup as trusted on the device without user interaction.

15. An apparatus, comprising:
   a memory; and
   a processor coupled to the memory, wherein the processor is configured by code in the memory to execute a proxy server to perform steps comprising:
   receiving a secure communication from an application, the application executing on the user device also executing the proxy server;
   decrypting the secure communication from the application using a first trust certificate associated with the proxy server and the application, the secure communication including a request for a network resource located at a network address;
   comparing the network address to a list of network addresses to determine whether communication with a network server at the network address is permitted; and
   when communication with the network server is permitted:
      communicating securely with the network server at the network address to retrieve the network resource using a second trust certificate associated with the proxy server and the network server to obtain the network resource; and
      communicating securely with the user device to forward the network resource using the first trust certificate associated with the proxy server and the application.

16. The apparatus of claim 15, wherein the processor is further configured to perform steps comprising:
   installing, on the user device, a smart agent configured to manage secure communications on the user device by registering the user device with a management server; and
   configuring, by the smart agent, the proxy server on the user device.

17. The apparatus of claim 16, wherein the processor is further configured to perform steps comprising installing, by the smart agent, the first trust certificate for communicating securely between the application and the proxy server.

18. The apparatus of claim 17, the step of installing the first trust certificate comprising installing the first trust certificate in an independent certificate store for the application, the application using the independent certificate store to communicate securely with the proxy server.

19. The apparatus of claim 17, the step of installing the first trust certificate comprising installing the first trust certificate in an operating system certificate store, the application using the operating system certificate store to communicate securely with the proxy server.

20. The apparatus of claim 16, wherein the processor is further configured to perform steps comprising:
   updating, by the smart agent, the list of network addresses for applying web filtering to secure communications from the application, the updating based on information received from the management server; and transmitting, by the smart agent, a log of secure communications from the application, the log being transmitted to the management server.

\* \* \* \* \*

UNITED STATES PATENT AND TRADEMARK OFFICE
CERTIFICATE OF CORRECTION

PATENT NO. : 10,841,280 B2  
APPLICATION NO. : 15/923557  
DATED : November 17, 2020  
INVENTOR(S) : Robert Chambers et al.

Page 1 of 1

It is certified that error appears in the above-identified patent and that said Letters Patent is hereby corrected as shown below:

On the Title Page

Item (73) Assignee should read: --LIGHTSPEED SOLUTIONS, LLC--

Signed and Sealed this
Twenty-fourth Day of August, 2021

Drew Hirshfeld
*Performing the Functions and Duties of the
Under Secretary of Commerce for Intellectual Property and
Director of the United States Patent and Trademark Office*